(12) United States Patent
Yagisawa et al.

(10) Patent No.: US 7,797,486 B2
(45) Date of Patent: *Sep. 14, 2010

(54) STORAGE SYSTEM

(75) Inventors: Ikuya Yagisawa, Machida (JP); Naoto Matsunami, Hayama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/068,260

(22) Filed: Feb. 5, 2008

(65) Prior Publication Data

US 2008/0140929 A1    Jun. 12, 2008

Related U.S. Application Data

(63) Continuation of application No. 11/086,239, filed on Mar. 23, 2005, now Pat. No. 7,346,732.

(30) Foreign Application Priority Data

Jan. 17, 2005    (JP) .............................. 2005-008513

(51) Int. Cl.
*G06F 12/00* (2006.01)
(52) U.S. Cl. ....................................... 711/112; 711/118
(58) Field of Classification Search .................. 711/112
See application file for complete search history.

(56) References Cited

U.S. PATENT DOCUMENTS

| 4,809,273 | A | 2/1989 | Jackowski et al. |
|---|---|---|---|
| 5,706,298 | A | 1/1998 | Sandorfi |
| 5,742,934 | A | 4/1998 | Shinohara |
| 5,819,054 | A | 10/1998 | Ninomiya et al. |
| 6,467,060 | B1 * | 10/2002 | Malakapalli et al. ........ 714/758 |
| 6,751,757 | B2 | 6/2004 | Biskup et al. |
| 6,952,797 | B1 | 10/2005 | Kahn et al. |
| 2004/0148461 | A1 | 7/2004 | Steinmetz et al. |

FOREIGN PATENT DOCUMENTS

| EP | 1 477 898 A1 | 11/2004 |
|---|---|---|
| JP | 2004-288078 | 10/2004 |

OTHER PUBLICATIONS

D. Patterson et al, "A Case for Redundant Arrays of Inexpensive Disks (RAID)", ACM SIGMOD Conference Proceeding, Jun. 1988, pp. 109-116.

* cited by examiner

*Primary Examiner*—Jack Lane
(74) *Attorney, Agent, or Firm*—Brundidge & Stanger, P.C.

(57) ABSTRACT

The storage system includes a disk controller for receiving write commands from a computer, and a plurality of disk devices in which data is written in accordance with the control of the disk controller. The size of the first block which constitutes the data unit handled in the execution of the input/output processing of the data in accordance with the write command by the disk controller is different from the size of the second block which constitutes the data unit handled in the execution of the input/output processing of data by the plurality of disk devices. The disk controller issues an instruction for the writing of data to the disk devices using a third block unit of a size corresponding to a common multiple of the size of the first block and the size of the second block.

8 Claims, 11 Drawing Sheets

STORAGE SYSTEM

CROSS-REFERENCES TO RELATED TO APPLICATIONS

The present application is a continuation application of U.S. Ser. No. 11/086,239, filed Mar. 23, 2005, now U.S. Pat. No. 7,346,732, which is hereby incorporated by reference into this application.

This application relates to and claims priority from Japanese Patent Application No. 2005-008513, filed on Jan. 17, 2005, the entire disclosure of which is incorporated herein by reference.

BACKGROUND

The present invention relates to a storage device system (hereafter referred to as a storage system) for storing data used by a computer, and more particularly relates to a storage system comprising a controller and a recording medium controlled by the controller in which the data block size handled by the controller and the data block size handled by the recording medium are different.

A disk array system is a type of storage system connected to a computer. Disk array systems, which are also known as RAID (Redundant Array of Inexpensive Disks) systems, constitute storage systems that comprise a plurality of disk devices arranged in an array and a controller for controlling said. Disk array systems, based on the parallel operation of the plurality of disk devices, facilitate the high-speed processing of read requests (hereafter referred to as read requests) and data write requests (hereafter referred to as write requests) and, in addition, the imparting of redundancy to data. Disk arrays systems, as is disclosed in D. Patterson and 2 others, "A case for Redundant Arrays of Inexpensive Disks (RAID)", ACM SIGMOD Conference Proceeding, June 1988, p. 109-116 (Non-patent Document), are classified into five levels on the basis of the type of data to which redundancy has been imparted and the configuration thereof.

Redundant data is produced in disk array systems in such a way that data can be restored when damage to a disk device occurs, and the redundant data is stored in disk devices different to those for the data. However, with the objective of further increasing the reliability of the disk array system as a whole, guarantee codes are sometimes added to the logic blocks stored in the disk devices. A description of guarantee codes is given in, for example, U.S. Pat. No. 5,819,054 and U.S. Pat. No. 5,706,298. In the guarantee code of U.S. Pat. No. 5,819,054, a logical address (hereafter LA (Logical Address) of the logic block designated by the computer in the accessing of a logic block and an LRC (Longitudinal Redundancy Check) obtained by the implementation of an exclusive OR operation on the logic block data are added to the logic block and the guarantee code and logic block are stored in the disk device. The LA and LRC are employed as error detection codes for detecting address errors in the storage region in which the logic block data is written and detection errors in the logic block data respectively.

SUMMARY

One example of a recording medium employed in a storage system is a low-cost ATA (AT Attachment) designed for personal computers. The structure of an ATA disk device is sometimes simplified in order to reduce development costs and component part costs, and in the majority of instances the size of the block (sector) that constitutes the unit at which data is handled in an ATA disk device is a fixed length.

In some cases in the employment in a storage system of a recording medium of fixed block length (sector length) such as an ATA disk device it is a possibility that the data unit of the data input/output processing performed on the recording medium by the storage system controller will be different to the data unit of the data input/output processing performed by the recording medium thereof. A problem inherent thereto is that this leads to the inability for data input/output processing to the recording medium to be performed. In addition, a similar problem arises in the case where a condition exists in which, when the data unit handled by the recording medium is not fixed, the data unit of the input/output processing performed on the recording medium by the storage system controller and the data unit handled by the recording medium cannot be formed to the same size.

By way of example, a case in which the disk array system controller, employing the technique and so on disclosed in U.S. Pat. No. 5,819,054, adds a guarantee code to data received from a computer and writes this data in a recording medium can be thought of as a specific example in which this kind of problem is liable to occur. That is to say, even if the size of the logic block data that serves as the unit for the handling of data in the accessing of data within a disk array system by a computer and the sector length of the ATA disk device are the same size, because the disk array system controller writes the data in the ATA device with a further guarantee code added to the logic block received from the computer, there are times when the data unit handled by the controller in the writing of data in the ATA disk device and the sector length of the ATA disk device differ. In cases such as this there are times when the controller cannot write the data to which the guarantee code has been added into the ATA disk device of fixed sector length.

Accordingly, a demand exists for a technique by which, where the data unit for the input/output of data to a recording medium implemented by the storage system controller and the data unit handled by the recording medium differ, the input/output processing of the data to the recording medium can be performed by the controller.

Considering the demand, one example of a storage system is provided. The storage system comprising a disk controller for receiving read commands and write commands from a computer, and a plurality of disk devices, connected to the disk controller, from/to which data is read/written in accordance with the control of the disk controller. A first block size that constitutes the data unit handled by the disk controller in the execution of input/output processing in accordance with the read commands and write commands, and a second block size that constitutes the data unit handled in the execution of the input/output processing of the data by the plurality of disk devices differ. The disk controller issues an instruction for the writing of data in the disk devices using a third block unit of a size corresponding to a common multiple of the size of the first block and the size of the second block.

The input/output processing of data to the recording medium is possible even when the data unit handled in the implementation of the input/output of data to the recording medium performed by the storage system controller and the data unit handled by the recording medium differ.

DESCRIPTION OF THE PREFERRED EMBODIMENTS

An outline of one embodiment of the present invention is given below. It should be noted that the present invention is not restricted to the embodiments outlined below.

Embodiment 1 provides an example of the input/output processing of data from a controller to a recording medium where the data unit handled in the implementation of the input/output of data to the recording medium performed by the storage system controller and the data unit handled by the recording medium differ. It should be noted that, although the description given for embodiment 1 is of one embodiment of the present invention in which, as one example of a storage system, a disk array is employed, the storage system of embodiment 1 is able to have application in not only a storage system that comprises redundant data such as the disk array system described in Non-patent Document but also in a storage system that does not comprise redundant data.

(1) Description of the System Configuration

Figure 1:
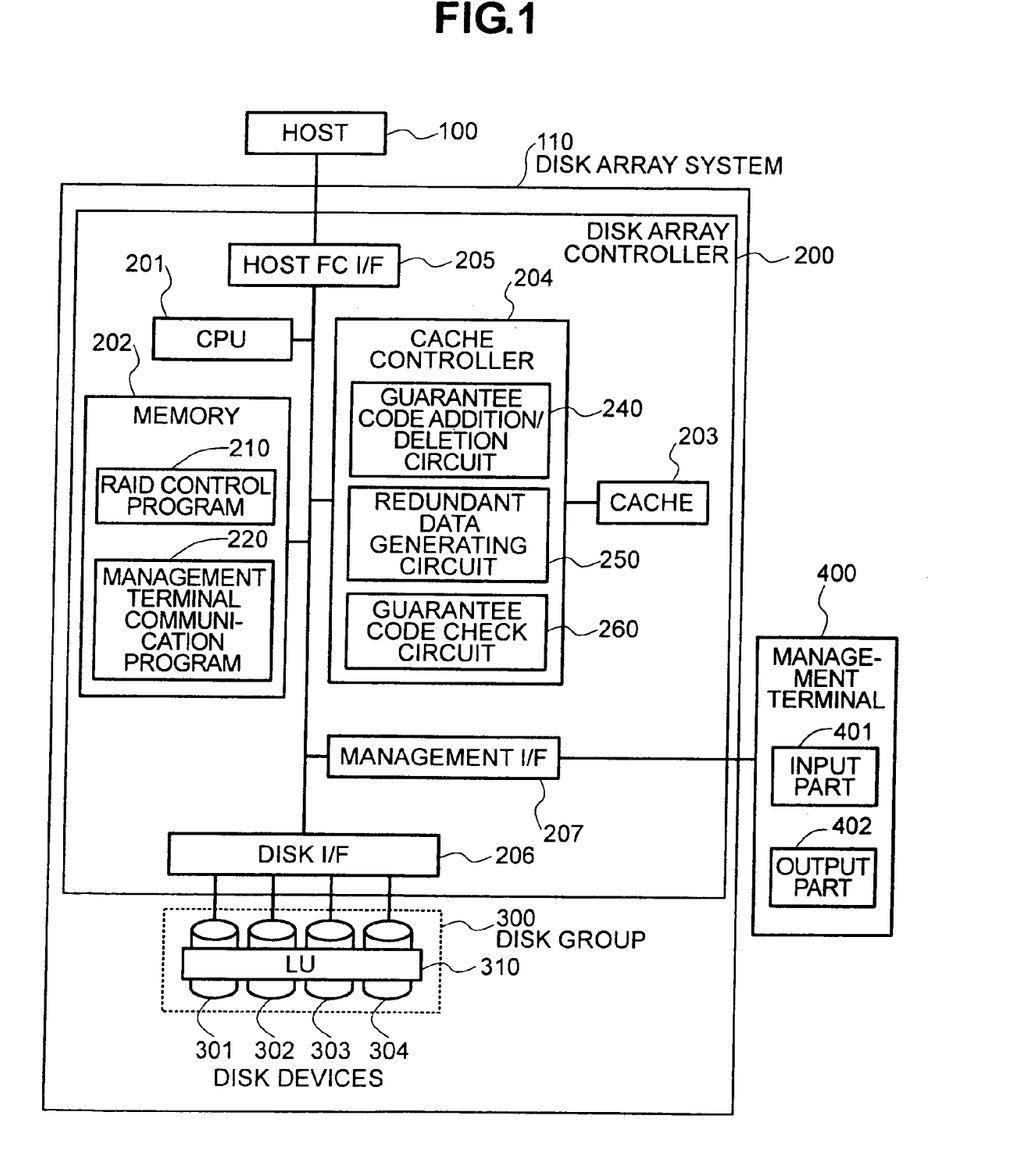
FIG. 1 is a diagram of one example of the configuration of a disk array system.

FIG. 1 is a diagram of one example of the configuration of the disk array system of this embodiment. A disk array system 110 constitutes a storage system with connection to a host computer (hereafter referred to as a host) 100 and in which data used by the host 100 is stored. The disk array system 110 comprises a disk array controller 200 and a disk group 300 connected thereto, and a management terminal 400 for inputting management information to the disk array system 110 and outputting the state of the disk array system 110 is connected to the disk array controller 200.

The disk array controller 200 comprises a CPU 201 for executing the control processing of the disk array system 110, a memory 202, a cache 203 for buffering the data accessed from the host 100, a cache controller 204 for controlling the cache 203, a host interface controller (hereafter, host FC I/F) 205 for the transmission of data with the host 100, a disk interface controller (hereafter, disk I/F) 206 for the transmission of data with a disk device formed as a disk group 300, and a management interface controller (hereafter, management I/F) 207 for the transmission of control information with the management terminal 400, each of which is line-connected by means of communication lines.

It should be noted that the cache controller 204 comprises a guarantee code addition/deletion circuit 240 for adding guarantee codes to data and deleting guarantee codes from data, a guarantee code check circuit 260 for checking the data in which the guarantee codes are employed, and a redundant data generating circuit 250 for implementing a generation processing of redundant data. In addition, although an FC interface controller that uses an FC (Fibre Channel) protocol is indicated as one example of the host interface controller 205 in this embodiment, the host interface controller 205 may be an interface controller that uses another protocol such as an iSCSI interface.

A RAID control program 210 executed by the CPU 201 for controlling the disk array system 110 and a management terminal communication program 220 executed by the CPU 201 for implementing communication with the management terminal 400 are recorded in the memory 202.

The disk group 300 comprises disk devices 301, 302, 303 and 304. An LU (Logical Unit) 310, which constitutes a logical storage region (logical volume) that forms the access target from the host 100, is configured from the storage region within the disk devices 301 to 304. The disk I/F 206 is connected to the disk devices 301 to 304. It should be noted that the number of disk devices 301 to 304 connected to the disk I/F 206 illustrated in FIG. 1 and the connection mode between the disk I/F 206 and the disk devices 301 to 304 is not restricted to the configuration illustrated in FIG. 1.

The management terminal 400 comprises, in the setting of the disk array controller 200 by the user or operator of the disk array system 110, an input part 401 employed for the input of information to the disk array controller 200, and an output part 402 for the output of information of the disk array system 110 acquired from the disk array controller 200. The input part is a keyboard and mouse or the like, and the output part is a display or the like.

(2) Corresponding Block Size Relationship

Figure 2:
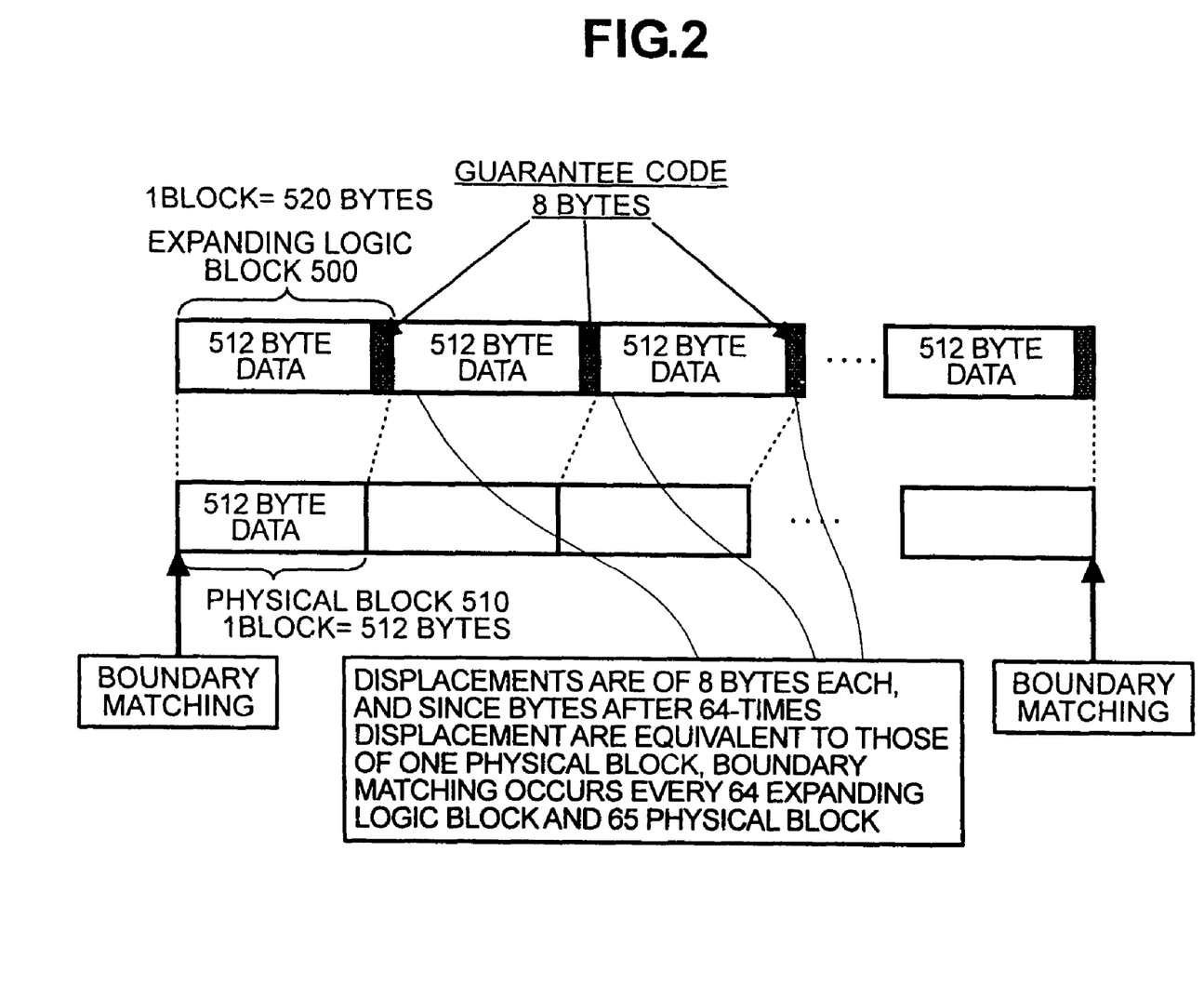
FIG. 2 is a diagram of one example of the corresponding relationship of an expanding logic block and a physical block.

FIG. 2 is a diagram illustrating one example of the corresponding relationship between the data unit handled by the disk array controller 200 and the data unit handled by the disk devices 301 to 304.

The upper level of FIG. 2 indicates the data unit handled in the input/output of data to the disk device by the disk array controller 200, and this data unit is defined as the "expanding logic block 500". The expanding logic block 500 is a block of length 520 bytes. The expanding logic block 500, which constitutes the unit for the input and output of data to the disk array system 110 by the host 100, is configured from a logic block configured from data of length 512 bytes and a guarantee code configured from an LA and LRC of length 8 bytes that is added to the logic block by the guarantee code addition/deletion circuit 240.

The lower level indicates the data unit handled in the input and output of data by the disk devices 301 to 304 and is defined as the "physical block 510". The physical block 510 constitutes a block of length 512 bytes.

It should be noted that, provided the size of the expanding logic block 500 and the size of the physical block 510 differ, the actual size of the blocks is not restricted to the example illustrated in FIG. 2. In addition, provided the size of the expanding logic block 500 and the size of the physical block 510 differ, application of the present invention is possible even if the expanding logic block 500 does not comprises a guarantee code (that is to say, where the expanding logic block is configured from data input and output from the host 100).

Although, in the example shown in FIG. 2, the expanding logic block 500 is 8 bytes larger than the physical block 510, since the sum of the difference in size between the two blocks is 512 bytes which is exactly equivalent to the size of a physical block when, in the aligning of a plurality of the two blocks, 64 expanding logic blocks and 65 physical blocks are aligned, the total size of 64 expanding logic blocks 500 matches that of 65 physical blocks 510. The state in which the total size of the two blocks matches in this way, in other words, the state in which a plurality of expanding logic blocks 500 and plurality of physical blocks 510 are aligned as a common multiple of the size of the expanding logic blocks 500 and the expanding physical blocks 510, is defined as "boundary matching". In addition, the data unit of the size corresponding to a common multiple of the size of the expanding logic blocks 500 and the physical blocks 510 is referred to hereafter as a "large-size block".

Where the plurality of expanding logic blocks 500 that constitute the write target to the disk devices 301 to 304 exist in a boundary matching state these expanding logic blocks 500 can be written into the disk devices 301 to 304 as a plurality of physical blocks 510. That is to say, in the example of FIG. 2, provided 64×N (N is an integer of 1 or more) of the expanding logic blocks 500 that form the write target to the disk devices 301 to 304 are assembled, these expanding logic blocks 500 can be written into the disk devices 301 to 304 as a 65×N number of physical blocks 510. Accordingly, the difference in data block size between the expanding logic block 500 and the physical block 510 can be absorbed. Thereupon, in this embodiment, the data that is to be written from the disk array controller 200 to the disk devices 301 to 304 can be written in large-size block unit.

(3) Another Example of Corresponding Block Size Relationship

Although FIG. 2 illustrates an example of the configuration of a large-size block based on the alignment of the expanding logic blocks 500, the configuration of the large-size block is not restricted to the example illustrated in FIG. 2. Thereupon, FIG. 3 and FIG. 4 illustrate other examples of large-size blocks.

Figure 3:
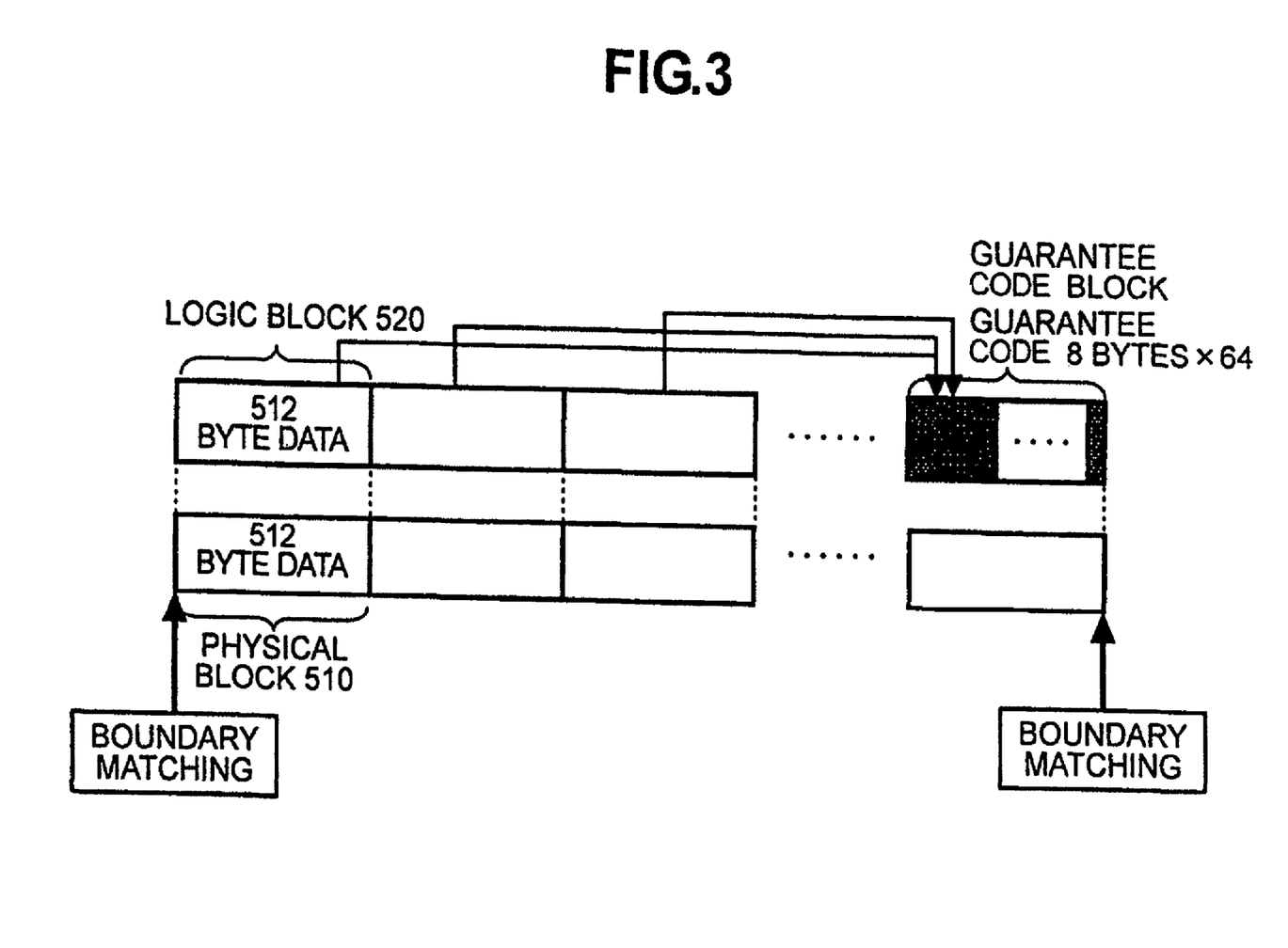
FIG. 3 is a diagram of another example of a large-size block.

FIG. 3 is a diagram that illustrates a second example of a large-size block. In the example illustrated in FIG. 3, logic blocks 520 of length 512 bytes which constitutes the data unit employed by the host 100 in the accessing of the disk array controller 200 and guarantee codes of length 8 bytes added to the logic blocks 520 are arranged in a position separate from the large-size block. That is to say, first, 64 logic blocks 520 of length 512 bytes are arranged in the large-size block and, after this, a guarantee code block made up of 64 guarantee codes for the 64 logic blocks 520 (by virtue of the fact that the size of the guarantee code added to each individual logic block 520 is 8 bytes the size of the guarantee code block is equivalent to 8 bytes×64=length 512 bytes) is arranged therein. It should be noted that the guarantee codes corresponding to the logic blocks 520 are arranged in the guarantee code block in an order of arrangement the same as that of the logic blocks 520 from which the large-size block is configured. Incidentally, provided the logic blocks 520 and corresponding relationship of the guarantee codes correspondent thereto are managed by the cache controller 204 or the like, the arrangement of the guarantee codes within the guarantee code block is not restricted thereto.

In the example of FIG. 3, the 64 logic blocks 520 and the guarantee code block arranged thereafter can be combined and handled as 65 physical blocks 510 whereupon, in this state, the condition of boundary matching can be met.

Figure 4:
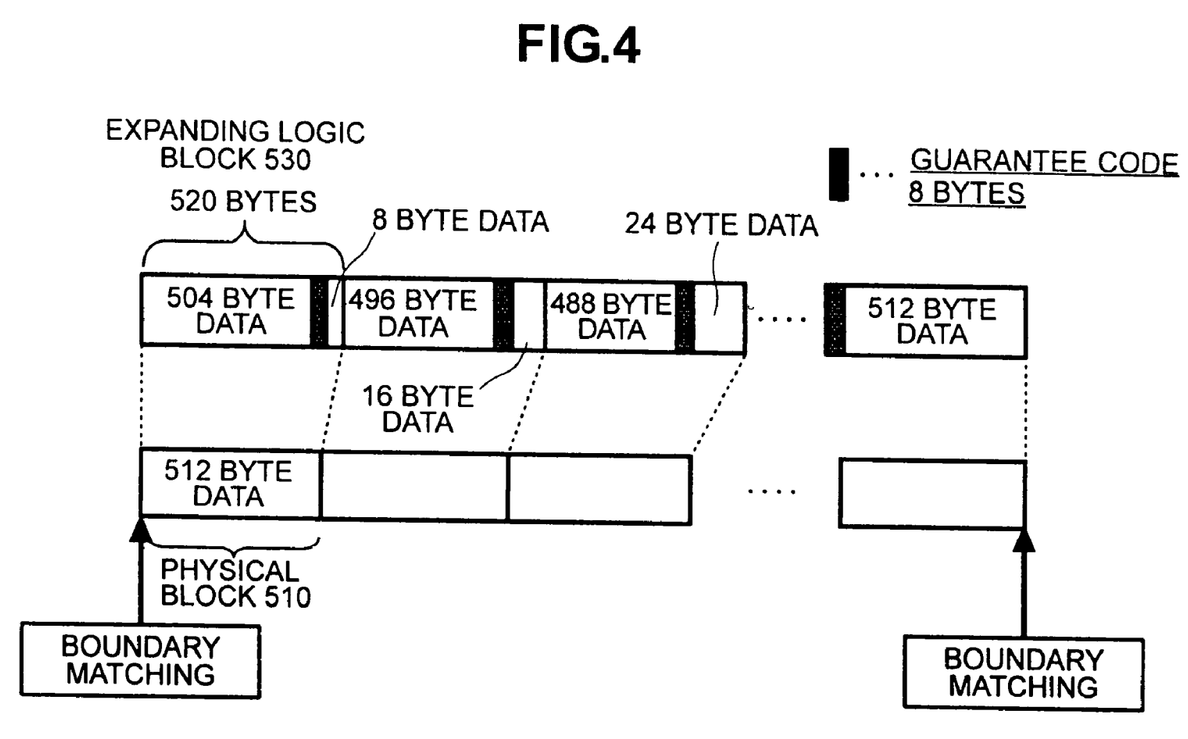
FIG. 4 is a diagram of another example of a large-size block.

FIG. 4 is a diagram of a third example of a large-size block. In the example illustrated in FIG. 4, in the same way as the example illustrated in FIG. 2, the large-size block is configured by the alignment of 64 expanding logic blocks of length 520 bytes. However, the configuration of the expanding logic blocks here is different to the example of FIG. 2 and the example of FIG. 4. That is to say, although guarantee codes of length 8 bytes are added to the back of the logic blocks of length 512 bytes of the expanding logic blocks 500 illustrated in FIG. 2, there is no guarantee code added to the back of the logic blocks of the expanding logic blocks 530 illustrated in FIG. 4.

In the expanding logic blocks 530 illustrated in FIG. 4 the position of the guarantee codes within the expanding logic blocks 530 is adjusted in such a way that guarantee code is stored in each individual physical block 510. As a result there are 64 guarantee codes in total and, although there is no guarantee code stored in the 65th physical block 510 of the 65 physical blocks 510 from which the large-size block is configured, guarantee codes are stored in each of the other individual physical blocks 510. Accordingly, in the example shown in FIG. 4, although the guarantee code for the $64^{th}$ expanding logic block 530 of the large-size block is added directly in front of the logic block, the 512 byte data logic blocks of the other expanding logic blocks 530 are partitioned into two data and a guarantee code is inserted in the logic block between the partitioned two data.

It should be noted that, although FIG. 4 illustrates an example in which, for the $1^{st}$ to the $64^{th}$ logic blocks of the physical blocks 510 from which the large-size block is configured, the position of the guarantee code within the expanding logic blocks 530 is adjusted in such a way that the guarantee code is stored in the end of the physical block 510, the method for determining the position of the guarantee code within the expanding logic block 530 is not restricted to the method shown in FIG. 4.

Hereafter a description will be given of an embodiment of the present invention based on the large-size block illustrated in FIG. 2 of embodiment 1 and embodiment 2, that is to say, based on the corresponding relationship of the expanding logic block 500 and the physical block 510 illustrated in FIG. 2. However, provided the assembly is one that facilitates the formation of the boundary matching state, the configuration of the large-size block may be a configuration other than that shown in FIG. 2 to FIG. 4. By way of example, the expanding logic block 500, expanding logic block 530, logic block 520, guarantee code block and physical block 510 may be of arbitrary size. In addition, the boundary matching state produced thereafter should constitute a state in which the sum of the difference in size between the data unit in the writing of data in the disk devices by the disk array controller 200 and the physical block 510 is equivalent to N×physical blocks 510 (N is an integer of 1 or more). In addition, the size of the expanding logic block 500, expanding logic block 530, logic block 520 and guarantee code may be smaller than the physical block 510.

In a summary of the above, provided a boundary matching state is formed, the size of the physical blocks 510 assembled with the expanding logic blocks 500, expanding logic blocks 530, logic blocks 520 and guarantee code block and so on is arbitrary, and the number of physical blocks 510 assembled with the number of, by way of example, expanding logic blocks 500, expanding logic blocks 530, logic blocks 520 and guarantee code blocks for forming the boundary matching is arbitrary.

(4) Write Processing

Next, a description will be given of the write processing of data from the disk array controller 200 to the disk devices of this embodiment.

Figure 5:
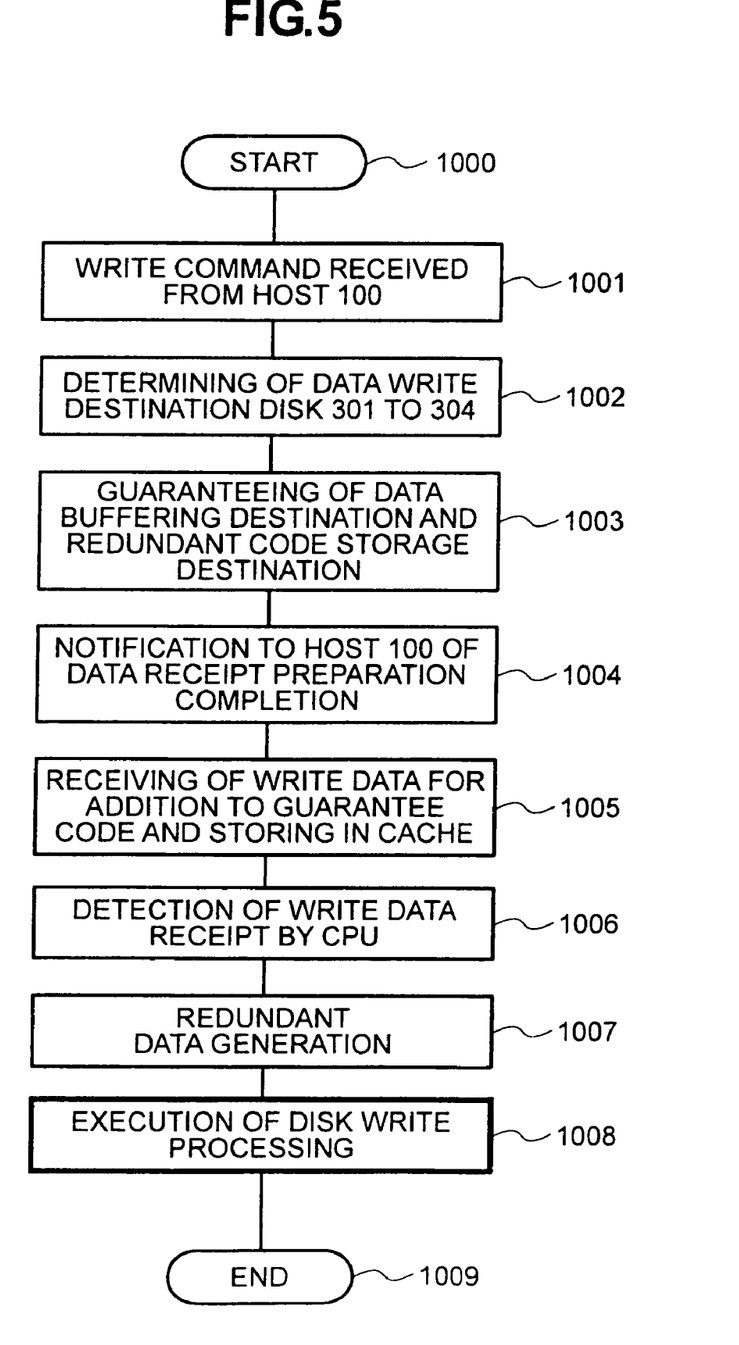
FIG. 5 is diagram of one example of data write processing.

FIG. 5 is a flow chart that illustrates one example of the operation performed in write processing of the disk array controller 200 of this embodiment, When the host 100 issues a write command to the disk array system 110, the disk array controller 200 receives the write command by way of the host FC I/F 205 (Step 1001). It should be noted that the host 100, using a logic block of length 512 bytes as a single unit, issues a write command of N times (N is an integer of 1 or more) the logic block, and an LA of the lead data written by the write command and the write data size (number of logic blocks that express of which logic block the data is) are contained in the write command.

The CPU 201 executes a RAID control program 210 and, in accordance with the LA contained in the write command, determines the write destination disk device for the write data (Step 1002) and, furthermore, guarantees in the cache 203 a buffering destination for the write data received in response to the write command and a storage destination for the redundant data generated for the write data (Step 1003). It should be noted that the CPU 201 guarantees in the cache 203 a storage destination for the guarantee code part added to the write data.

Next, the CPU 201, by way of the host FC I/F 205, notifies the host 100 that preparation for the receipt of data has been completed (Step 1004). The host 100 sends write data of the number of logic blocks designated by the write command to the host FC I/F 205. The write data received by the host FC I/F 205 is sent to the cache controller 204, and the guarantee codes (that is to say, the lead LA of the logic block and the LRC) for each logic block of length 512 bytes is generated by the guarantee code addition/deletion circuit 240, whereupon the logic block and guarantee code are stored in the storage region of the cache 203 guaranteed by Step 1003 (Step 1005). It should be noted that the method for the generating of the LA and LRC is described in detail in U.S. Pat. No. 5,819,054.

Furthermore, the host FC I/F 205 provides notification to the CPU 201 of receipt of the write data. When the CPU 201 detects notification from the host FC I/F 205 of the receipt of the write data (Step 1006), it controls the redundant data generating circuit 250 in such a way that, employing the RAID control program 210, redundant data correspondent to the received write data is generated, whereupon the redundant data generating circuit 250 generates redundant data (Step 1007). The generated redundant data is stored in the region of the cache 203 guaranteed by Step 1003.

Next, the CPU 201 issues an instruction to the disk I/F 206, and the disk I/F 206, in accordance with the order from the CPU 201, writes either the write data and the guarantee codes or the redundant data stored in the cache 203 in any one of the disk devices from 301 to 304 (Step 1008).

Figure 6:
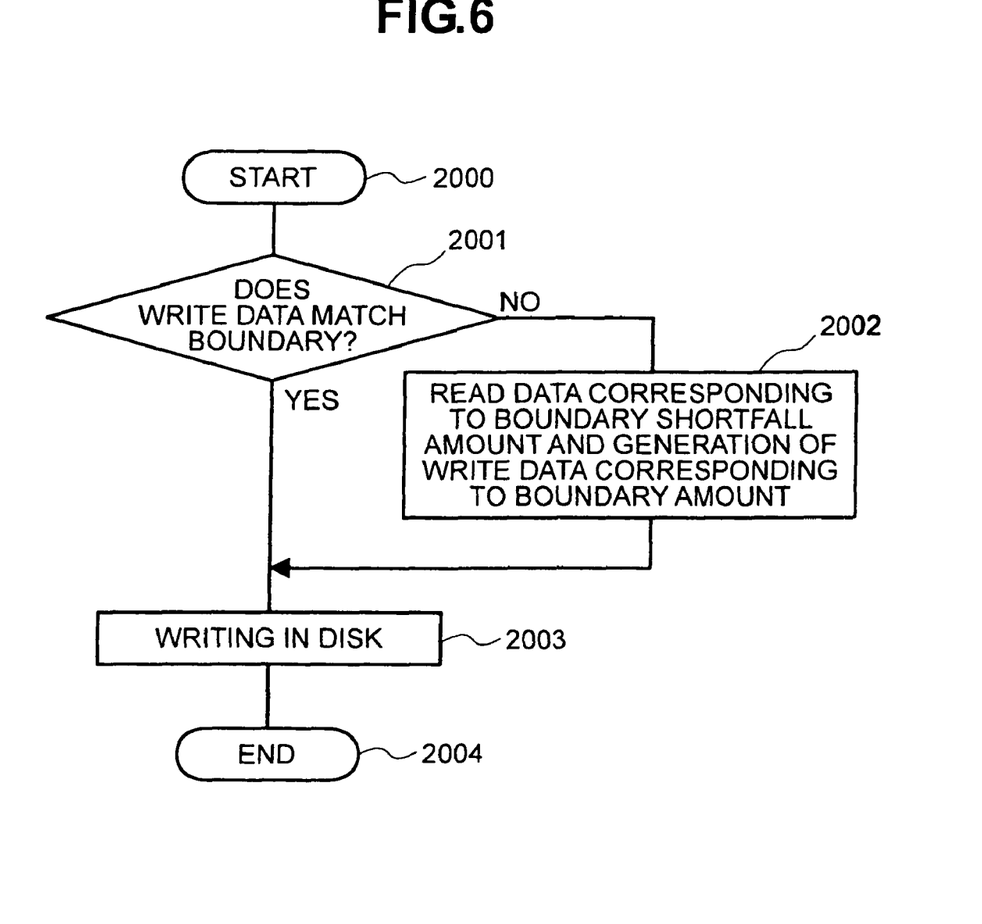
FIG. 6 is a diagram that provides a detailed example of the processing for the writing of data in a disk device.

A detailed description is given next, with reference to FIG. 6, of an example of the processing performed in the writing of data in the disk devices of Step 1008 of FIG. 5.

In the writing of data into the disk devices the disk array controller 200 executes write processing using a large-size block as the unit data. Thereupon, first of all, the CPU 201 judges whether the data that is to be stored in the cache 203 and that is to be written in the disk devices exists in an amount that, in the corresponding relationship with the physical blocks 510, will form the boundary matching state (Step 2001). That is to say, a judgment is made as to whether the logic blocks and guarantee codes written into the cache 203 in Seep 1005 of FIG. 5 exist in the amount from which a large-size block is configured. This judgment is implemented by the CPU 201 in accordance with the write command received from the host 100 in Step 1001 of FIG. 5. That is to say, by virtue of the fact that the number of logic blocks contained in the write command illustrates whether the size of the write data written from the host is appropriate for the number of logic blocks 520, it is clear that, provided the number of logic blocks is 64 or more, the expanding logic blocks 500 will exist in the cache 203 exists in an amount that forms the boundary matching state. In addition, it is clear that, if the logic block number contained in the write command is 63 or less, the expanding logic blocks 500 will not exist in the cache 203 in an amount that forms the boundary matching state.

It should be noted that, in the abovementioned embodiment, the logic block data received from the host 100 and the redundant data generated by the disk array controller 200 in Step 1007 of FIG. 5 are written in the disk device using the same method. Accordingly, the data written in the disk device using the processing illustrated in FIG. 6 may be redundant data and, in this case, in Step 2001, a judgment is made as to whether the redundant data is written in the cache in the amount from which a large-size block is configured.

Where the data that is to be stored in the cache 203 and that is to be written in the disk devices forms a boundary matching state, the disk array controller 200, by way of the disk I/F 206, writes the data of a large-size block amount into any one of the disk devices (Step 2003).

On the other hand, where the data that is to be stored in the cache 203 and that is to be written in the disk devices does not form the boundary matching state, in other words, where part of the data from which the large-size block is configured is not aligned in the cache 203, the disk array controller 200 reads from the disk devices data of an amount equivalent to the shortfall in the data from which the large-size block is configured (in other words, the amount not stored in the cache 203), whereupon the large-size block is configured from the data stored in the cache 203 and the newly read data (Step 2002) and data equivalent to the amount of a large-size block is written by way of the disk I/F 206 into any one of the disk devices (Step 2003).

The description given above represents one example of the write processing to the disk devices implemented in Step 1008 of FIG. 5.

Next, a description will be given with reference to FIG. 7 of what is referred to as large-size write in which the write processing to the disk devices of Step 2003 of FIG. 6 where the logic blocks and guarantee codes written in the cache 203 have been judged in Step 2001 of FIG. 6 to exist in an amount that is equivalent to the size of data from which a large-size block is configured.

Figure 7:
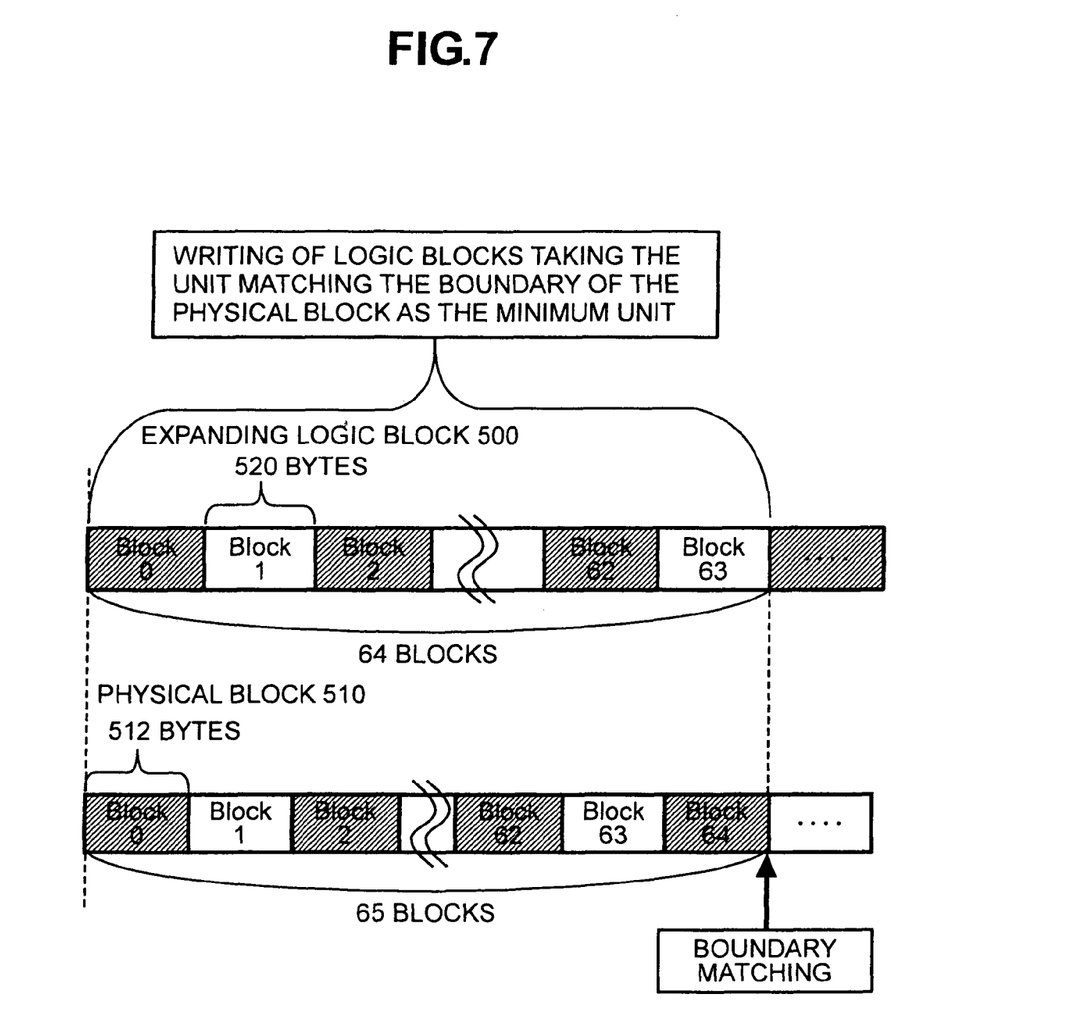
FIG. 7 is a diagram of one example of large-size write processing.

The disk devices 301 to 304 handle data using the physical blocks 510 of the lower stage illustrated in the lower level of FIG. 7 as a single unit. On the other hand, the CPU 201 manages the data to be written in any one of the disk devices 301 to 304 as the expanding logic blocks 500 illustrated in the upper level of FIG. 7. Thereupon, the CPU 201 issues an instruction to the disk I/F 206 in such a way that a set of data comprising 64 expanding logic blocks 500 stored in the cache 203 is written into the disk devices as a set of data comprising 65 physical blocks 510. The disk I/F 206 that has received this instruction, employing a single write command handled by the disk devices 301 to 304, writes 65 physical blocks 510 of data (this is equivalent to the data of 64 expanding logic blocks 500) into any one of the disk devices 301 to 304. That is to say, the CPU 201, taking a unit that matches the boundary of the physical blocks 510 of the disk devices 301 to 304 as the minimum unit, writes the expanding logic blocks 500 into the disk devices 301 to 304.

Figure 8:
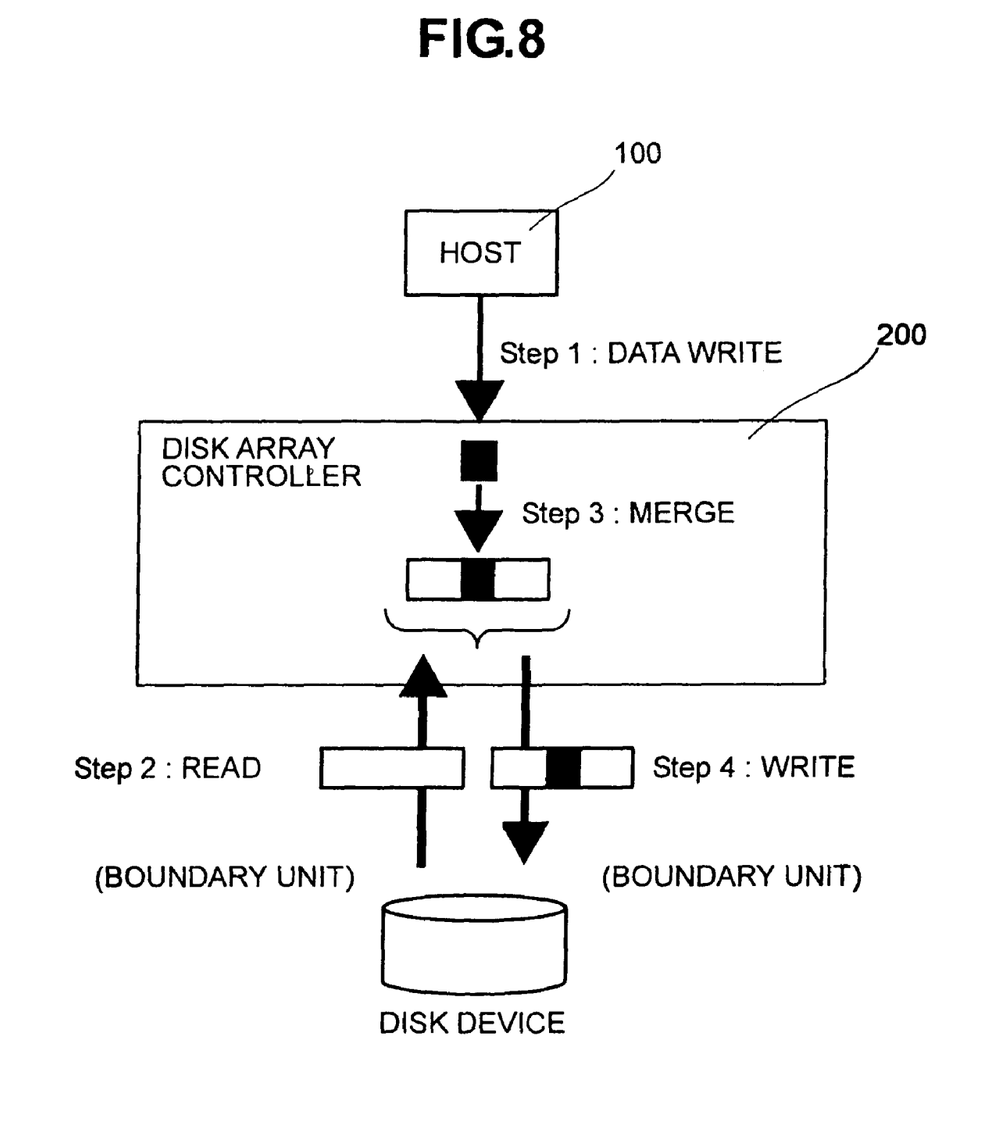
FIG. 8 is a diagram of one example of small-size write processing.

On the other hand, a description is given with reference to FIG. 8 of what is referred to as small-size write in which the write processing to the disk devices of Step 2003 of FIG. 6 where the logic blocks and guarantee codes written in the cache 203 have been judged in Step 2001 of FIG. 6 not to exist in an amount that is equivalent to the size of data from which a large-size block is configured. The small-size write of the diagram constitutes a merging of the processing equivalent to Step 2002 and Step 2003 of FIG. 6 and the write from the host 100.

The disk array controller 200 which has received write data from the host 100 (Step 1) stores the write data and generated guarantee codes for the write data in the cache 203 (FIG. 5 Step 1005) and, generating redundant data correspondent to this write data, stores this in the cache 203 as well (FIG. 5 Step 1007).

Where the CPU 201 in Step 2001 of FIG. 6 judges that the data that is to be written in the disk devices does not exist in the cache 203 in an amount equivalent to the size of the large-size block, the CPU 201 issues an instruction to the disk I/F 206 and, from the disk device that constitutes the write destination of the data, reads data (that is to say, the physical block data and the guarantee codes) equivalent to the amount of the shortfall thereof (Step 2). The CPU 201 prepares a data set equivalent to the amount of the large-size block by merging the data stored in the cache 203 and the data of the shortfall amount read from the disk device in Step 2 (Step 3). The CPU 201 issues an instruction to the disk I/F 206 whereupon the data set of the amount of the large-size block prepared in Step 3 is written into the disk device in a large-size block unit.

(5) Read Processing

Figure 9:
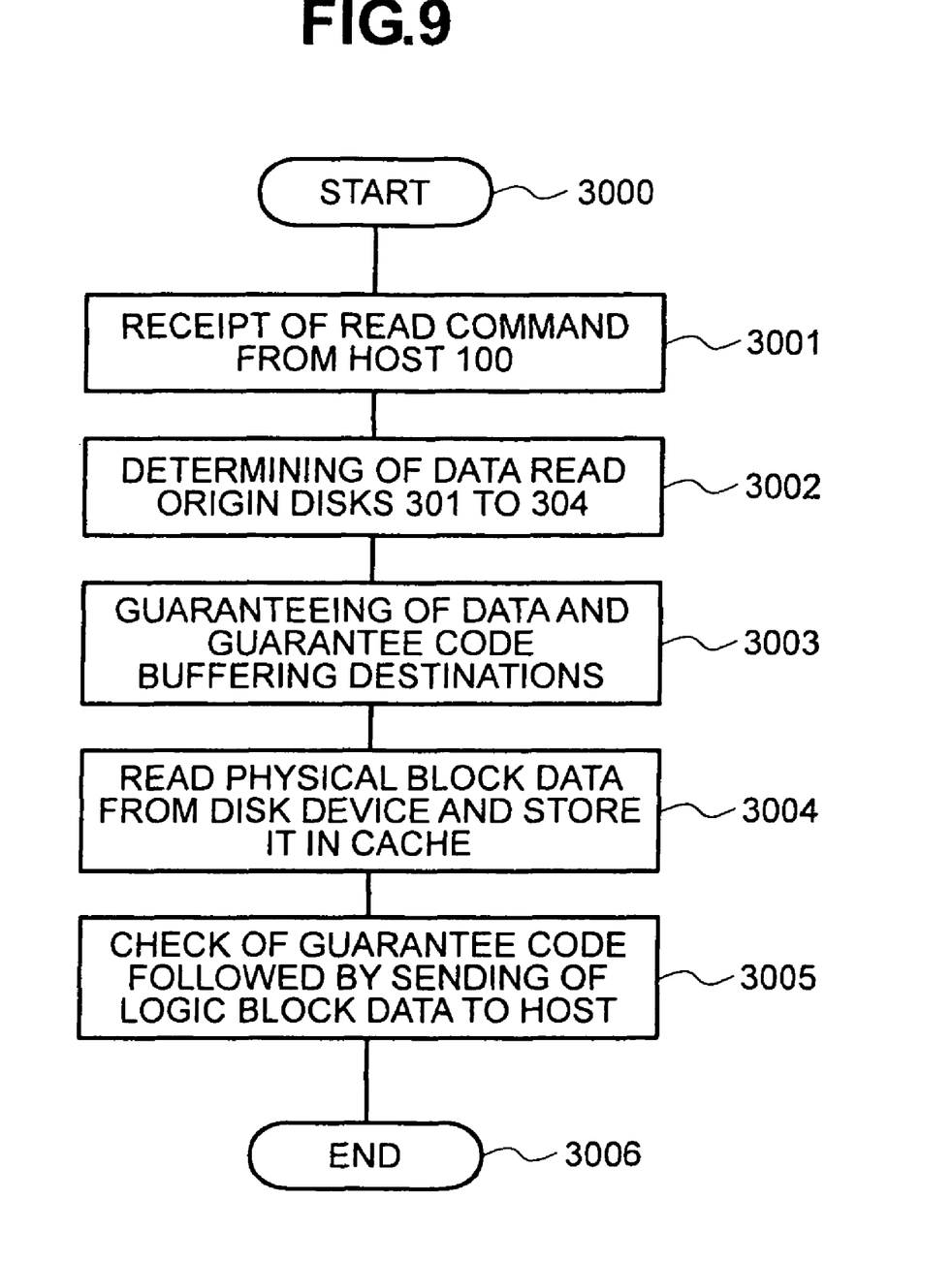
FIG. 9 is a diagram of one example of read processing.

Next, a description will be given of the read processing of the embodiment with reference to FIG. 9.

The CPU 201 of the disk array controller 200 that has received a read command from the host 100 (Step 3001) performs a check of the lead LA of the read target data designated by the read command and the number of logic blocks that indicate the size of the read target data. The CPU 201 specifies from the lead LA and the logic blocks the logic blocks 520 to be read from the disk devices and the guarantee codes that have been added to these logic blocks. Furthermore, the CPU 201 specifies the physical blocks 510 in which the specified logic blocks and guarantee codes are stored and determines from which disk device data is to be read (Step 3002). By virtue of the fact that the CPU 201 is aware of the corresponding relationship between the expanding logic blocks 500 and the physical blocks 510, the physical blocks 510 that are to be read can be determined in accordance with this corresponding relationship.

By way of example, for the large-size blocks of the configuration illustrated in FIG. 2 and FIG. 4, provided the number of logic blocks designated by the read command is 1, two of the physical blocks 510 corresponding to the expanding logic blocks containing the designated logic blocks (the two physical blocks are physical blocks that are connected as in the example of FIG. 2 and FIG. 4) will form a data read source logic block 510. In addition, where the configuration of the large-size block is that as shown in FIG. 3, the physical block 510 that corresponds to the logic block 520 designated by the read command and the physical block 510 that corresponds to the guarantee code will form the data read source physical block 510.

It should be noted that, for the purpose of decreasing the number of commands issued to the disk device from the disk array controller 200, the data of physical blocks other than the physical blocks that correspond to logic blocks designated by the read command and the guarantee codes added thereto may be read together using a single command whereupon only the required information within the read data is used. By way of example, where the data that is to be read is stored in discrete logic blocks 520, data may be read out in a single command from a plurality of continuous physical blocks containing the discreet logic blocks 520. In this case, the CPU 201, in Step 3002, reads most of the physical blocks and specifies them as read physical blocks 510.

Next, the CPU 201 guarantees a storage region in the cache 203 for the storing of the read physical block data and guarantee codes (Step 3003).

The CPU 201 issues an instruction to the disk I/F 206 and the disk I/F that has received this instruction issues a read command to the disk device designated by the CPU 201 in such a way that the physical block data designated by the CPU 201 is read. The disk I/F 206 stores the data read out from the disk device in the storage region of the cache 203 guaranteed by Step 3003 (Step 3004).

When data from the disk device is read out from the cache 203 a guarantee code check circuit 260 performs a check of the guarantee codes using the method described in U.S. Pat. No. 5,819,054. When it has been confirmed that there are no errors in the read data, data of the logic blocks of the data stored in the cache 203 without a guarantee code is sent to the host 100 (Step 3005).

(6) Effect

Based on this embodiment, the disk array controller 200 writes data in the disk devices using a unit at which the boundary for the data block that is handled by the disk devices (that is to say, the physical blocks 510) and the boundary of the data block handled by the disk array controller 200 (that is to say, the logic blocks 520) are matching (that is to say, a large-size block). As a result, data can be written from the disk array controller 200 into the disk devices even if the data unit handled by the disk array controller 200 and the data unit of the data handled by the disk devices differ.

In addition, data to which a guarantee code has been added can be written in disk devices of fixed data block size and, accordingly, the reliability of the disk array system 110 can be increased.

Embodiment 2

Figure 10:
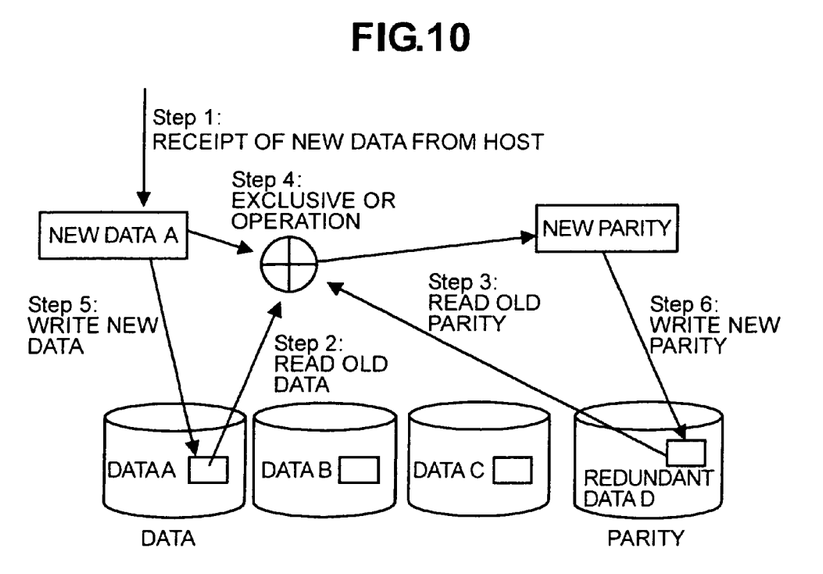
FIG. 10 is a diagram of one example of write processing to an LU of a RAID 5 configuration.

In a second embodiment a description is given of a method for the writing of redundant data into a disk array system 110 using a large-size block unit. It should be noted that the configuration of the disk array system 110 may be the same as the example illustrated in FIG. 1. However, in embodiment 2, the process uses an LU 310 as an LU of a RAID 5 configuration. Of course, provided the LU 310 constitutes an LU with redundant data, other configurations besides an RAID 5 configuration such as a RAID 3 and RAID 6 configuration are possible, (1) Write Processing on an LU of a RAID 5 Configuration FIG. 10 illustrates one example of the processing implemented in the writing of data to an LU 310 of a RAID 5 configuration in accordance with a write command from a host 100. In the example of FIG. 10, a redundant data D is formed which constitutes the result of an exclusive OR operation employing data A, data B and data C. Here, provided all of data A, data B and data C are updated in accordance with the write command from the host 100, the disk array controller 200 can employ the write data (that is to say, new data A, new data B and new data C) to generate the new redundant data D. However, where redundant data cannot be generated with only the write data received from the host 100, by way of example, where only new data A as illustrated in FIG. 10 is sent to the disk array controller 200 and only data A is updated by the new data A, as is disclosed in Non-patent Document, a read/modify/write processing of the disk devices is generated.

That is to say, in cases such as this, when the disk array controller 200 receives new data A from the host device 100 (Step 1), the disk array controller reads data A (old data) to generate new redundant data D (Step 2) and, furthermore, reads redundant data D (old redundant data) to generate new redundant data D (Step 3). The disk array controller 200 performs an exclusive OR operation employing the new data A, data A and redundant data D to generate new redundant data D (Step 4). After this, the disk array controller writes the new data A in the disk devices (Step 5) and writes the new redundant data D in the disk devices (Step 6).

It should be noted that guarantee codes as described for embodiment 1 may be generated for the new data A, and the guarantee coded new data A may be written in the disk devices. This is the same in the processing of FIG. 11 and FIG. 12 outlined below.

(2) Example of Read/Modify/Write Processing Using a Large-Size Block Unit

As is described for the first embodiment, the writing of data from the disk array controller 200 to the disk devices is performed using a large-size block. This is the same for not only the writing of data received from the host device 100 but also the redundant data of the LU of the RAID 5 configuration. Here, with reference to FIG. 11, an outline of one example of redundant data generation processing and write processing for the writing of redundant data using a large-size block will be given.

Figure 11:
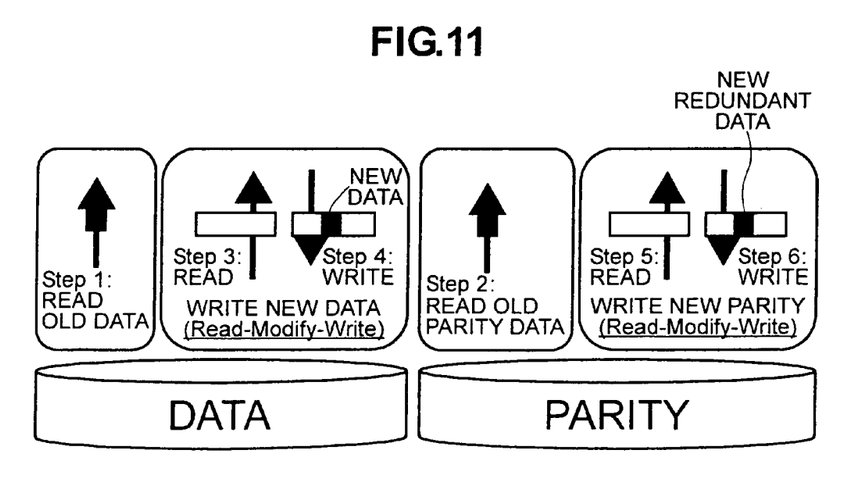
FIG. 11 is a diagram of one example of redundant data generation processing and write processing in the writing of redundant data using a large-size block unit.

When a write command is received from the host 100 the disk array controller 200 is able to recognize the size of the new data (write data) received from the host 100 based on the number of physical blocks contained in the write command. Thereupon, where the disk array controller 200 judges that, when new data is received from the host 100, new redundant data cannot be generated, it executes read/modify/write processing to generate new redundant data from old data, old redundant data and new data.

More specifically, to generate new redundant data, the disk array controller 200 reads from the cache 203 the physical blocks containing old data and the guarantee codes thereof (Step 1) and the physical blocks containing old redundant data (Step 2). The read processing of the old data and guarantee codes and the old redundant data is the same as that of the processing illustrated in FIG. 9. Next, the disk array controller 200 generates new redundant data from the old data, old redundant data and the new data received from the host device 100.

Next, each of the new data and the new redundant data are written in the disk devices from the disk array controller 200. Here, where the size of the new data and guarantee codes or the size of the new redundant data is smaller than the size of the large-size block, the small-size write described with reference to FIG. 8 is executed on each of the new data and the new redundant data.

First of all, to write the new data in the disk devices, the disk array controller 200 reads data from the new data write destination disk devices equivalent to the shortfall amount (Step 3). The disk array controller 200 merges the new data and guarantee codes thereof with the read data to configure a large-size block, and writes the large-size block in the disk devices (Step 4).

Next, the new redundant data is written in the disk devices in the same way. That is to say, the disk array controller 200 reads from the new redundant data write destination disk device data equivalent to a shortfall amount (Step 5). The disk array controller 200 merges the new redundant data with the read data to configure a large-size block, and writes the large-size block in the disk devices (Step 6).

Based on the processing outlined above, the disk array controller 200 can write data and redundant data using a large-size block unit in a plurality of disk devices from which a RAID is configured.

(3) Another Example of Read/Modify/Write Processing Using a Large-Size Block Unit In the processing illustrated in FIG. 11, in order to write the new data and the new redundant data in the disk devices access of the disk devices by the disk array controller 200 is generated a total of 6 times. Thereupon, a description will be given with reference to FIG. 12 of an example of write processing in which the number of times access to the disk devices is reducible.

Figure 12:
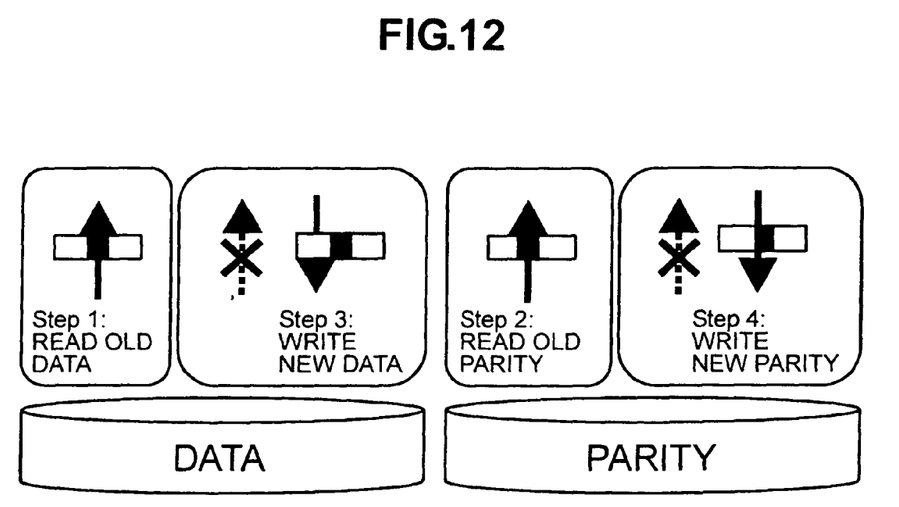
FIG. 12 is a diagram of another example of redundant data generation processing and write processing in the writing of redundant data using a large-size block unit.

In the example of FIG. 12, in the reading of the old data and old redundant data in the read/modify/write processing, the old data and old redundant data are read using a large-size block unit.

In other words, in the read/modify/write processing, the disk array controller 200 first reads large-size block data containing old data from the disk devices to the cache 203 (Step 1), and then reads large-size block data containing old redundant data from the disk devices to the cache 203 (Step 2). Next, the disk array controller 200 implements an exclusive IR operation to generate new redundant data from old data, old redundant data and new data received from the host 100.

Next, the disk array controller 200 performs updating employing data of the section of the large-size block data read in Step 1 equivalent to the new data and the guarantee codes thereof, and writes the updated large-size block data into the disk devices (Step 3).

In the same way for the new redundant data, the disk array controller 200 performs updating employing the redundant data of the section of the large-size block data read in Step 2 equivalent to the new redundant data, and writes the updated large-size block data into the disk devices (Step 4).

In the example of the read/modify/write processing illustrated in FIG. 12, different to the example illustrated in FIG. 11, there is no need for the reading of redundant data equivalent to the shortfall in advance in order to write the new data and new redundant data using a large-size block unit. That is to say, this read processing is executed together with the read processing of the old data and old redundant data required for redundant data generation (Step 1 and Step 2). Accordingly, in the example illustrated in FIG. 12, different to the example illustrated in FIG. 11, the number of times access to the disk devices from the disk array controller 200 required for the read/modify/write processing can be reduced to four.

By virtue of the fact that, as a result, the number of times access to the disk devices required for the processing of a write command received from the host device 100 can be reduced, the number of write commands that can be produced per unit proportionate to the access performance of the disk devices is increased. Accordingly, the performance of the disk array system 110 can be improved.

(3) Effect

Based on the present embodiment, new data and new redundant data can be written into the disk devices in large-size block units. In addition, the number of times access of the device required for this can be reduced, and the number of times access to the disk devices required for the processing of a single write command can be reduced. Accordingly, the write performance of the disk array controller 110 can be improved.

It should be noted that, in this embodiment, although new data and redundant data are written into the disk devices using a large-size block, in reality, where the size of the data that is to be written (new data and guarantee code group or new redundant data) is the size of the large-size block or less, the data may be written in the disk devices using a multiple unit of the physical blocks.

In this case, the disk array controller 200 reads data of the physical blocks in which overwritten predetermined data and guarantee codes (or redundant data) are stored, updates part of the data of the read physical blocks using the new data and the guarantee codes (or the new redundant data), and writes the updated data into the disk devices in multiple units of the physical blocks.

Furthermore, where read/modify/write processing is required, in the same way as that for the second embodiment the number of times access to the disk devices can be reduced by the implementation of a processing in which, in the reading of old data or the reading of old redundant data for generating redundant data, "data of the physical blocks in which overwritten predetermined data and guarantee codes (or redundant data) are stored is read from the disks".

It should be noted that, although embodiment 2 cites the use of a RAID 5 as the example RAID configuration of the disk array system 110 in which a redundant configuration is adopted, other configurations may be used such as RAID 3 or RAID 6 configurations to which 2 types of redundant codes have been added. The same applies for embodiment 1.

In addition, although the guarantee code add/delete/check and redundant data generation are executed on the data using the cache controller 204 in embodiment 1 and embodiment 2, these processings may be executed by other regions and, by way example, they may be executed by the CPU 201 using a program in the memory 202.

Furthermore, although embodiment 1 and embodiment 2 cite, as an example of the disk devices 301 to 304, an ATA device disk in which the size of the data bock is fixed, other types of disk devices may be used. In addition, even if the data block size handled by the disk device is variable, embodiment 1 and embodiment 2 are effective as long as the data block size handled by the disk devices and the disk array controller 200 are not the same.

What is claimed is:

1. A storage system comprising:
    a disk controller including a cache memory and configured to receive a read/write command from a computer; and
    a plurality of disk devices coupled to the disk controller, from/to which data is read/written,
    wherein in accordance with the write command, data to be stored in the plurality of disk devices is stored in the cache memory as a sequence of plural logic blocks,
    wherein for each of the plural logic blocks, a data guarantee code is generated by the disk controller, and plural guarantee codes generated for the plural logic blocks are stored together as a guarantee code block in the cache memory,
    wherein the plural guarantee codes are arranged in the guarantee code block in an order of arrangement that is not restricted to an order of arrangement of the plural logic blocks in the sequence of plural logic blocks,
    wherein a size of the guarantee code block is not larger than that of a logic block of the plural logic blocks, and
    wherein the disk controller issues an instruction to store in the plurality of disk devices, the plural logic blocks and the guarantee code block.

2. The storage system according to claim 1, wherein the disk controller prepares a large-size data block including the plural logic blocks and the guarantee code block, and issues an instruction to the plurality of disk devices to store data of the large-size data block, and wherein
    a size of the large-size data block is equal to a multiple of a data block size handled by each of the plurality of disk devices for data input/output processing.

3. The storage system according to claim 1, wherein a size of the logic block is equal to that of the data block handled by each of the plurality of disk devices for data input/output processing.

4. The storage system according to claim 1, wherein a size of the guarantee code block is equal to that of the logic block.

5. A method of data storage in a storage system having a plurality of disk devices coupled to a disk controller from/to which data is read/written in accordance with read/write commands received from a computer, comprising the steps of:
    receiving a write command from a computer and storing data to be stored in the plurality of disk devices in a cache memory of the disk controller as a sequence of plural logic blocks,
    generating a data guarantee code by the disk controller for each of the plural logic blocks, and storing the plural guarantee codes generated for the plural logic blocks together as a guarantee code block in the cache memory, wherein the plural guarantee codes are arranged in the guarantee code block in an order of arrangement that is not restricted to an order of arrangement of the plural logic blocks in the sequence of plural logic blocks, and a size of the guarantee code block is not larger than that of a logic block of the plurality of logic blocks, and
    issuing an instruction with the disk controller to store in the plurality of disk devices, the plural logic blocks and the guarantee code block.

6. The method of data storage in a storage system according to claim 5, including preparing with the disk controller a large-size data block including the plural logic blocks and the guarantee code block, and issuing an instruction to the plurality of disk devices to store data of the large-size data block, wherein
    a size of the large-size data block is equal to a multiple of a data block size handled by each of the plurality of disk devices for data input/output processing.

7. The method of data storage in a storage system according to claim 5, wherein the storing of data in the cache memory as a sequence of plural logic blocks stores the logic blocks of a size equal to that of the data block handled by each of the plurality of disk devices for data input/output processing.

8. The method of data storage in a storage system according to claim 5, wherein the generating of the guarantee code block generates the guarantee code block of a size that is equal to that of the logic block.

* * * * *